United States Patent [19]
Fleischer et al.

[11] Patent Number: 5,361,848
[45] Date of Patent: Nov. 8, 1994

[54] AGRICULTURAL CULTIVATOR

[75] Inventors: Mathew W. Fleischer; John C. David; Russell G. Evans, all of Columbus; Robert R. Cutsor, Silver Creek; Elmer S. Zach, Columbus, all of Nebr.

[73] Assignee: Fleischer Manufacturing, Inc., Columbus, Nebr.

[21] Appl. No.: 942,513

[22] Filed: Sep. 9, 1992

[51] Int. Cl.$^5$ ............................................. A01B 5/00
[52] U.S. Cl. ........................... 172/140; 172/145; 172/149; 172/159; 172/174; 172/180; 172/186; 172/194; 172/583; 172/744
[58] Field of Search ............... 172/140, 145, 146, 148, 172/149, 151, 158, 159, 174, 175, 180, 182, 184, 186, 193, 194, 195, 201, 395, 583, 675, 744, 701; 111/193

[56] References Cited

U.S. PATENT DOCUMENTS

| | | | |
|---|---|---|---|
| 3,327,786 | 6/1967 | Meyer | 172/151 |
| 3,680,648 | 8/1972 | Tonsfeldt | 172/159 |
| 4,336,844 | 6/1982 | Helbig et al. | 172/140 |
| 4,550,122 | 10/1985 | David et al. | 172/158 |
| 4,553,607 | 11/1985 | Behn et al. | 172/140 |
| 4,560,011 | 12/1985 | Peterson et al. | 172/194 |
| 4,579,179 | 4/1986 | Vachon | 172/395 |
| 4,738,316 | 4/1988 | Wood | 172/744 |
| 4,819,737 | 4/1989 | Frase | 172/395 |
| 4,834,189 | 5/1989 | Peterson et al. | 172/158 |
| 5,046,346 | 9/1991 | Pegoraro | 172/180 |
| 5,078,216 | 1/1992 | Dick | 172/583 |
| 5,082,064 | 1/1992 | Landoll et al. | 172/583 |

FOREIGN PATENT DOCUMENTS 2123265  2/1984  United Kingdom ............... 172/151

Primary Examiner—Clifford D. Crowder
Assistant Examiner—Michael A. Neas
Attorney, Agent, or Firm—Emrich & Dithmar

[57] ABSTRACT

Improvements are disclosed for independent adjustment of the gauge wheel, disc hillers, stabilizer disc and, if desired, the rear, central sweep for an agricultural cultivator unit. The adjusting mechanism includes a screw jack which is easily accessible from the top of the cultivator for setting the adjustment of vertically telescoping inner and outer tubular sections, and a clamp for maintaining the setting once the adjustment is made. Improvements in the disc hiller structure itself include an indicator plate located at the top of the shank on which the disc is mounted for indicating the angular adjustment of the working angle of the disc, and a forged shank having a circular cross-section at the top, and a flattened portion at the bottom to provide strength but flexibility. Improvements are also disclosed for mounting the sweep to the distal end of the main beam, including a screw jack and clamp arrangement of the type used to adjust the disc hillers and stabilizer disc, a rigid clamp using a single bolt and two cast clamp plates, and a spring cushion mechanism permitting the sweep shank to rotate rearwardly and upwardly when an obstruction is encountered.

24 Claims, 9 Drawing Sheets

AGRICULTURAL CULTIVATOR

FIELD OF THE INVENTION

The present invention relates to agricultural cultivators for row crops; and more particularly it relates to cultivators of the type which are designed for use in ridge planting operations and those cultivators which encounter heavy residue during cultivating.

BACKGROUND OF THE INVENTION

Cultivators are well-known in the agricultural industry. There are many different designs and different tools used for row crop cultivators, including sweeps, discs, tines and combinations of these tools. However, there is a desire to reduce the amount of capital used in farming by having a cultivator that may be used for different functions, such as both cultivating row crops and preparing seed beds. In addition to versatility in application, there is a demand to have almost universal and independent adjustment of the various tools for each cultivator unit. Past designs have relied heavily on adjusting mechanisms which were either unreliable or too cumbersome or complicated to achieve easily the kinds of adjustment required. Not only are adjustments of the tools on a cultivator row unit required for different applications, but even for the same application (e.g., row crop cultivating), the settings of the various tools may be changed as soil conditions, crop maturity, amount of residue, degree of weed growth and other factors change. A final consideration in the design of the present cultivator is that it is suited for farmers employing conservation tillage concepts, whether that includes conventional planting or ridge planting. Conservation tillage fields normally have heavy residue (to conserve water and provide mulch), and a more rugged, heavy-duty cultivator is normally desired for these farming practices.

SUMMARY OF THE INVENTION

The present invention is directed to improvements in a cultivator row unit which has a forward gauge wheel, followed by laterally spaced right and left disc hillers, a large, central stabilizing disc and a rear, central sweep. A first adjusting mechanism which includes a screw jack is designed to facilitate adjustment of the height of the cultivator beam frame relative to the ground (by raising or lowering the beam frame relative to the gauge wheel, all the tools carried by the beam frame are adjusted correspondingly, but as a unit).

A similar adjustable screw jack is used to mount the disc hillers, carried by a common mounting bar, relative to the main beam frame of the row unit. A unique clamp is provided for securing the telescoping lower section of the screw jack in place during and after adjustment.

Further improvements are directed to the disc hillers themselves wherein the shank which carries the disc has an upper section of circular cross section, but is flattened in its lower portion to provide greater flexibility as the disc encounters obstructions or varying amounts of resistance from the soil. Further, the upper end of the disc shank is provided with an indicator plate which positions the disc in a desired working angle and clearly indicates the setting of the disc so that all discs may be uniformly set.

A similar adjusting screw jack is provided for the stabilizer disc so that it may be adjusted independently of the main frame beam. Finally, improvements are made in the mounting of the sweep to the tail end of the main frame beam which include an inexpensive clamp, operated by a single bolt, using a pair of clamp plates, and a second embodiment which employs a screw jack similar to the one used for adjusting the stabilizer disc. A spring cushion assembly may also be employed for mounting the sweep to the main beam frame, if desired, to avoid breakage by permitting the sweep to move rearwardly and upwardly if it strikes an object, yet be reset under the force of the cushion spring which urges it into the working position.

One or more of the adjusting features may be used, according to the desires of the farmer, but if all the adjusting features of the present invention are incorporated into the same row unit, the tools of the row unit may be set according to the wishes of the farmer for any of the varying type of conditions or uses he may desire, and all of the various adjustments are quickly and reliably effected, and they will remain in their settings under the rugged conditions normally encountered by a field cultivator, even one that is used in conservation tillage practices.

Other features and advantages of the present invention will be apparent to persons skilled in the art from the following detailed description of a preferred embodiment accompanied by the attached drawing wherein identical reference numerals will refer to like parts in the various views.

DETAILED DESCRIPTION OF A PREFERRED EMBODIMENT

Figure 1:
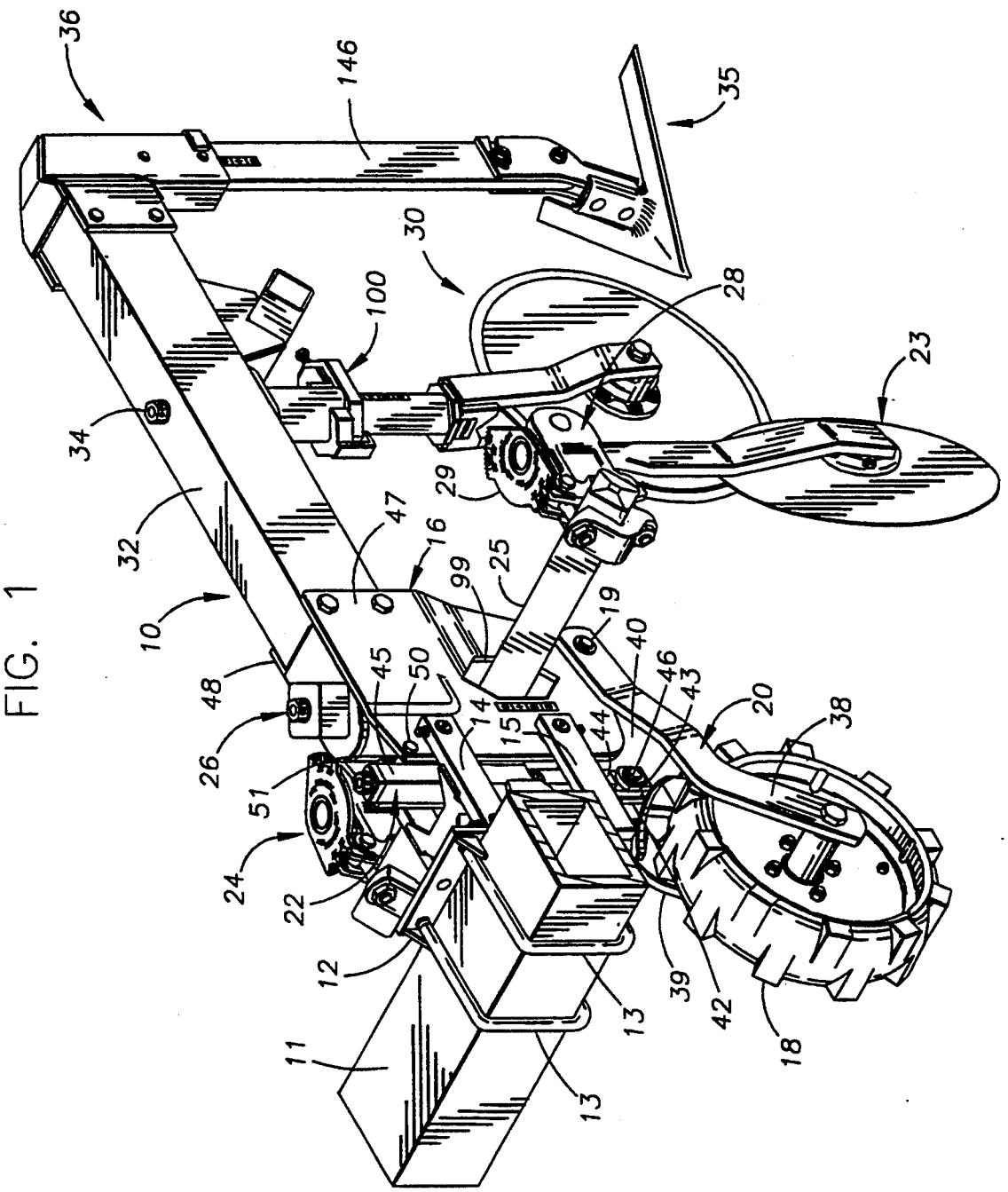
FIG. 1 is a perspective view, taken from an upper, frontal and left side perspective, of a cultivator unit constructed according to the present invention and having an adjustable gauge wheel.

Turning first to FIG. 1, reference numeral 10 generally designates a cultivator unit (sometimes referred to as a "row unit") which is mounted to a toolbar of an implement frame. The implement frame, which is conventional and need not be shown in detail for a complete understanding of the invention, is mounted to a tractor, also in a conventional manner. The implement frame may be cantilevered to the tractor by mounting it to the tractor three-point hitch, or it may be a drawn implement, having its own support wheels.

The cultivator unit 10 is one of a number of similar cultivator units mounted to the toolbar 11 and set laterally apart at a spacing determined by the row spacing of the crop being cultivated, typically 30 through 40 inch for beans and corn. The spacing of the cultivator units for other purposes depends upon the intended use of the implement.

The cultivator unit 10 is mounted to the toolbar 11 by means of a row mounting bracket 12 which is secured to the rear surface of the toolbar 11 by U-bolts 13. A pair of parallel links 14, 15 have their forward ends pivotally mounted to one side of the row mounting bracket 12 and their rear ends pivotally mounted to a flex mounting bracket generally designated 16. The links 14, 15 form parallel linkage weldments between the cultivator unit and the toolbar, permitting the cultivator unit to follow the contour of the ground, by raising and lowering independently of the height of the toolbar in a conventional manner.

Before discussing the details of the cultivator unit, the principal subassemblies or functional components will be identified briefly. At the forward end of the cultivator unit is a gauge wheel 18 which is pivotally mounted to the flex mounting bracket 16 at 19 by a gauge wheel arm assembly generally designated 20. In the embodiment illustrated in FIG. 1, the height of the cultivator unit is set relative to the ground by means of the gauge wheel and an adjustable screw jack generally designated 22.

Figure 7:
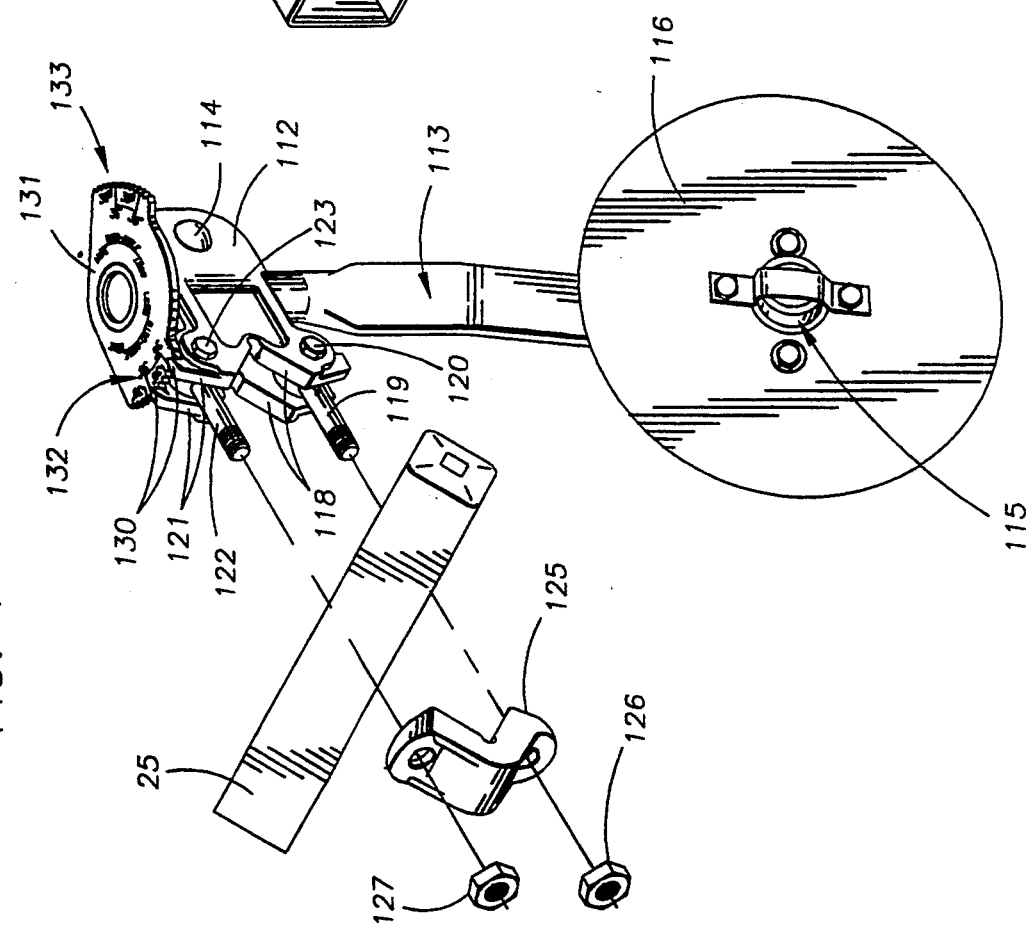
FIG. 7 is a close-up perspective view of a hiller disc incorporating the invention with components of its mount shown in exploded relation.

Behind the gauge wheel is a disc hiller assembly including left and right side disc hillers, the left side disc hiller being seen in FIG. 1 and designated generally by reference numeral 23, and the uppermost portion of the right side disc hiller is generally designated 24 and seen more fully in FIG. 7. The disc hillers 23, 24 are mounted to a common bar 25 which is independently adjustable in height relative to the gauge wheel 18 and the cultivator unit by means of a disc hiller height adjusting assembly generally designated 26. The working angle of the discs may also be adjusted by a clamp assembly generally designated 28, and an indicator plate 29 mounted to the top of the shaft carrying the disc conveniently indicates the working angle of the disc and locks the angle in place once an adjustment is made.

Rearward of the hiller discs is a centrally located, larger stabilizer disc generally designated 30, and it, too, may be independently adjustable in height relative to a main beam frame 32 of the cultivator unit by means of a stabilizer disc height adjusting assembly generally designated 34.

Behind the stabilizer disc is a sweep assembly generally designated 35 which is mounted to the tail end of the main beam frame 32 by a sweep shank height adjusting assembly generally designated 36 so that the operating depth of the sweep may also be adjusted independently of the operating depth of the disc hiller and stabilizing disc and main beam frame.

Gauge Wheel Arm Adjustment

Still referring to FIG. 1, the gauge wheel arm 20 includes a left bar 38, a right bar 39, and a transverse plate 40 which are welded in the shape shown. The upper, rear ends of the bars 38, 39 are pivotally connected to the flex mounting bracket 16 by means of the bolt 19; and the lower, forward ends of the bars 38, 39 are mounted to the spindle of the gauge wheel 18. A pair of tabs 42, 43 are welded to the top of the plate 40, and they receive the lower section 44 of the screw jack 22 by means of a bolt 46 and wear bushing. The upper section of the screw jack 22 is an elongated square housing 45 which is pivotally mounted to the side plates 47, 48 of the flex mounting bracket 16 by means of a bolt 50 which is received in a collar 51 (see FIG. 5) welded to the rear surface of the upper section 45 of the screw jack.

Figure 5:
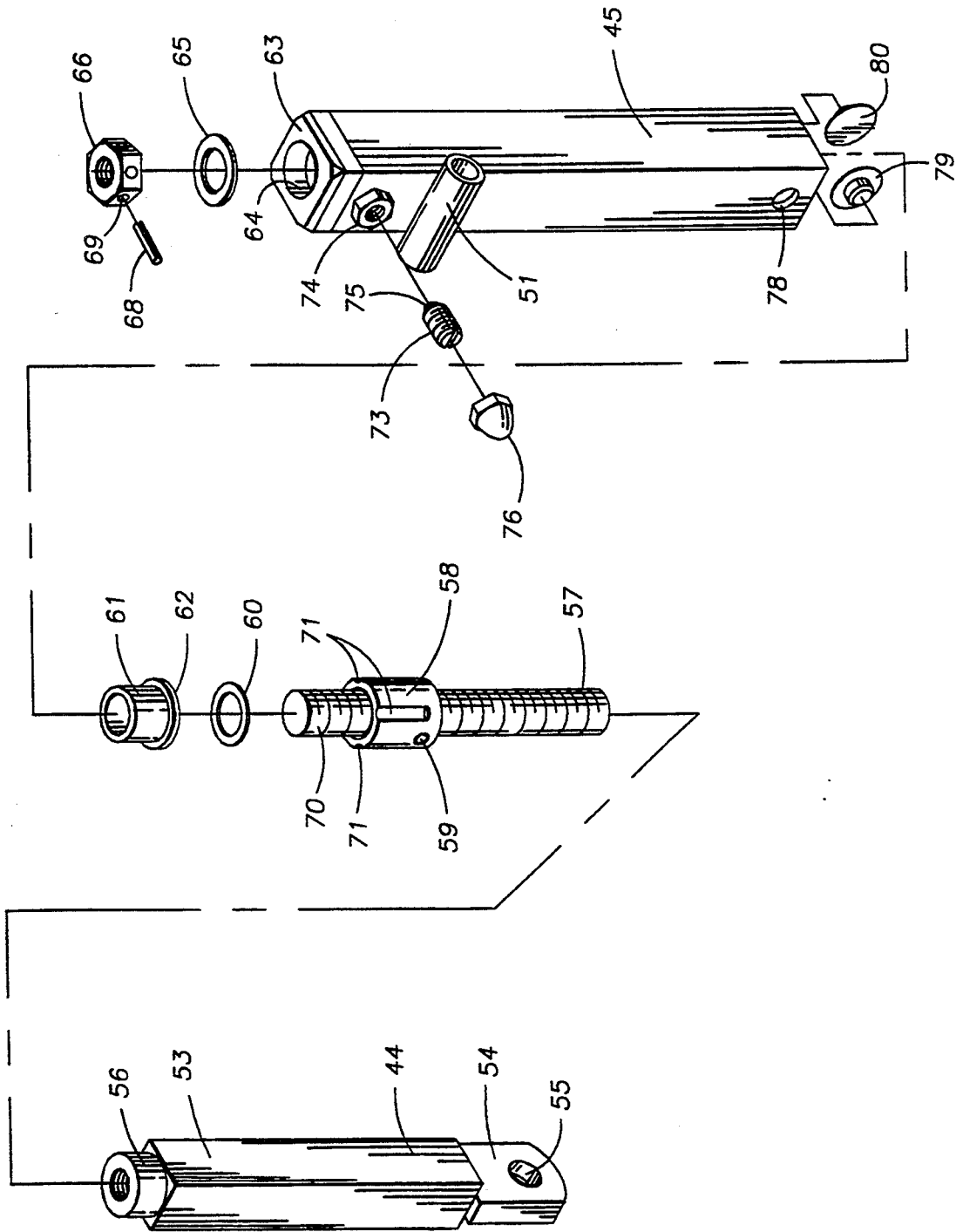
FIG. 5 is an upper perspective view of the components of the adjusting screw jack of FIG. 3 shown in exploded relation.

Turning now to FIG. 5, the components of the screw jack 22 may be seen. The lower section 44 has a center section 53 which is tubular and square in cross-section, the bottom of which is provided with a mounting tab 54 which contains an aperture 55 for receiving the pivot bolt 46. The upper part of the lower section 44 contains an internally threaded collar 56 which is welded to the top and receives a screw 57 which has an exterior acme thread. A grooved collar 58 is mounted toward the top of the threaded rod 57. The grooved collar 58 is secured to the threaded rod 57 by means of a roll pin 59. The purpose of the grooved collar 58 is to limit the rotational movement of the screw 57 relative to the upper housing section 45, thus regulating the vertical movement of the lower section 44. A washer 60 is received on the threaded rod 57 above the grooved collar 58; and a flanged bushing 61 is received on the threaded rod 57 above the washer 60. The threaded rod 57 is received in the hollow interior of the upper section 45 of the screw jack, which also has a square cross-section and is designed to receive the lower section 44 of the screw jack in telescoping relation.

The upper end of the upper section 45 is provided with a cap 63 which includes an aperture 64 through which a flanged bushing 61 and the upper end of the threaded rod 57 are placed. A washer 65 is then received on the top of the threaded rod, and a nut 66 is threaded onto the upper portion of the threaded rod 57. A roll pin 68 is pressed through an aperture 69 in the nut 66 and a corresponding aperture 70 in the top of the threaded rod 57, and through another aperture (not seen) on the other side of the nut 66 so that the nut 66 is rigidly attached to the top of the threaded rod 57. As the nut 66 is turned, so is the screw 57 and the grooved collar 58.

The grooved collar 58 is provided with four axially extending grooves spaced equally about the perimeter of the outer cylindrical surface of the collar 58, one of which is seen in FIG. 5 and designated 71. A set screw 73 is received in a welded nut 74 in the top of the upper section 45 of the screw jack, and the inner end of the set screw 73 is provided with a spring-biased detent ball 75 which, in operation, resiliently presses against the outer surface of the grooved collar 58 adjacent the grooves 71. As the threaded rod 57 is turned, the detent ball 75 rolls along the outer cylindrical surface of grooved collar 58 and rides into and out of the grooves 71 as they are traversed. This allows the operator to have a "clicking" audible sense of the adjustment as well as a physical sense as the detent ball 75 engages one of the grooves. The operator preferably sets the screw 57 such that the detent ball 75 rides in one of the grooves 71 after an adjustment is made. This coupling resists further rotation of the threaded rod 57 after a height adjustment of the gauge wheel is made.

A cap nut 76 is received on the outer end of the set screw 73 to prevent accidental or unintentional turning of the set screw.

The bottom portion of the upper housing section 45 contains an aperture 78 in which a low friction plastic bearing pad 79 is received; and a similar pad 80 is mounted in a corresponding aperture on the other side of the upper housing section 45. The bear pads 79, 80 engage opposing surfaces of the central section 53 of the lower housing section 44 or the jack screw to reduce friction and thereby facilitate smooth adjustment.

In operation, as the nut 66 is turned, the threaded rod 57 is also turned and the lower portion of the threaded rod 57 is driven into or out of the threaded collar 56, depending on the direction in which the threaded rod 57 is turned. This adjusts the lower section 44 of the screw jack telescopically relative to the upper housing section 45, and thereby adjusts the gauge wheel 18 to raise or lower the gauge wheel 18, which raises or lowers the cultivator unit (that is, the main beam frame 32) relative to the ground.

Alternative Embodiment

Figure 2:
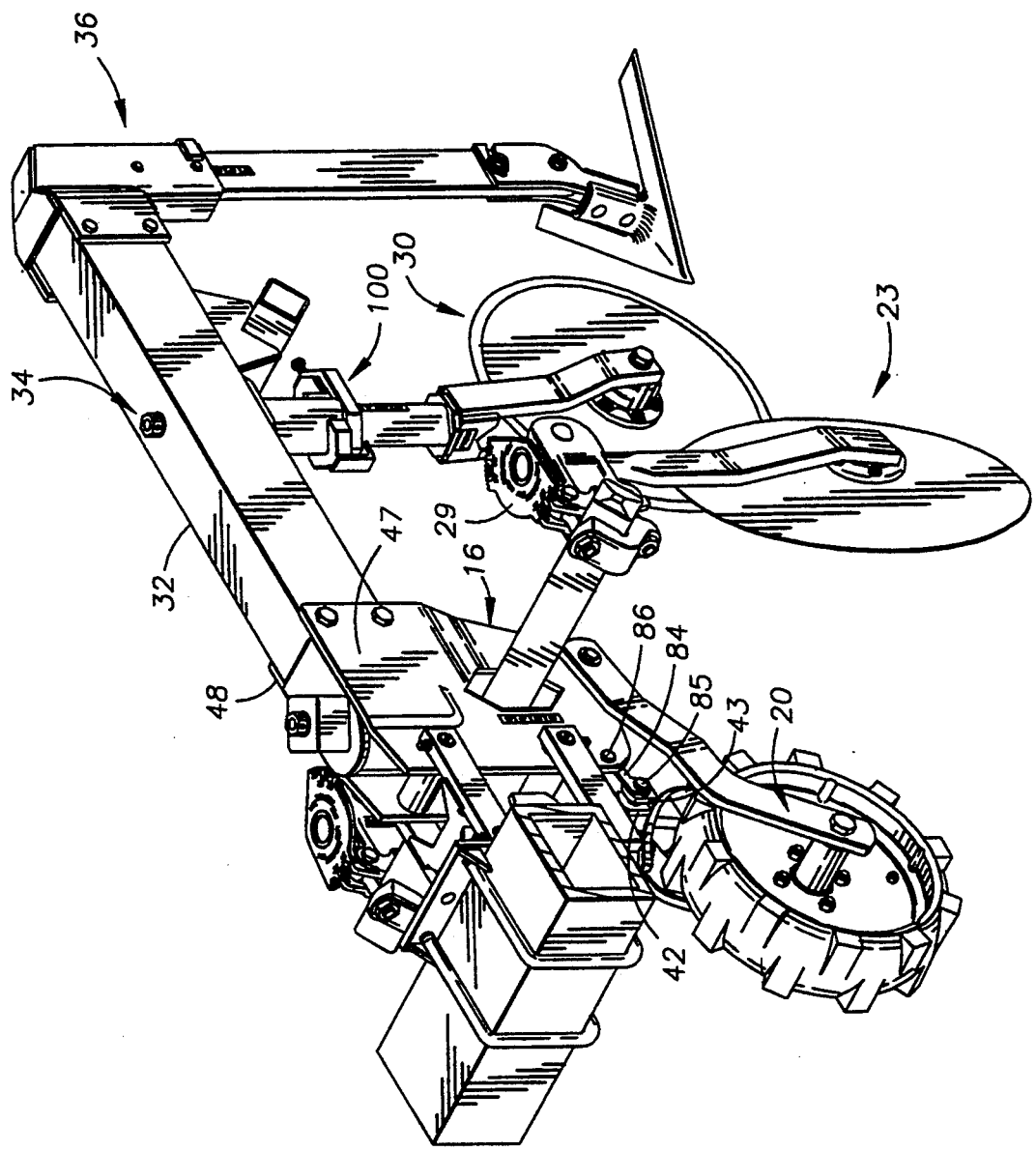
FIG. 2 is a perspective view, taken from an upper, frontal and left side perspective, of a cultivator unit constructed according to the present invention and wherein the gauge wheel is not adjustable.

Turning to the embodiment of FIG. 2, those elements which are identical to those already described in connection with FIG. 1 are identified by corresponding reference numerals and need not be further described herein. The embodiment of FIG. 2 does not have the feature just described which permits adjustment of the operating depth of the gauge wheel. Rather, a link 84 is connected by a bolt 85 and wear bushing to the tab 43 of the gauge wheel arm assembly 20; and the upper, rear end of the link 84 is rigidly attached by means of a bolt 86 to the lower, front portion of the side plate 47 of the flex mounting bracket 16. A similar link, not seen in FIG. 2, connects the right tab 42 to the right side plate 48 of the flex mounting bracket, so that the gauge wheel arm 20 is not adjustable relative to the flex mounting bracket 16.

Adjustment of the Disc Hillers

Figure 3:
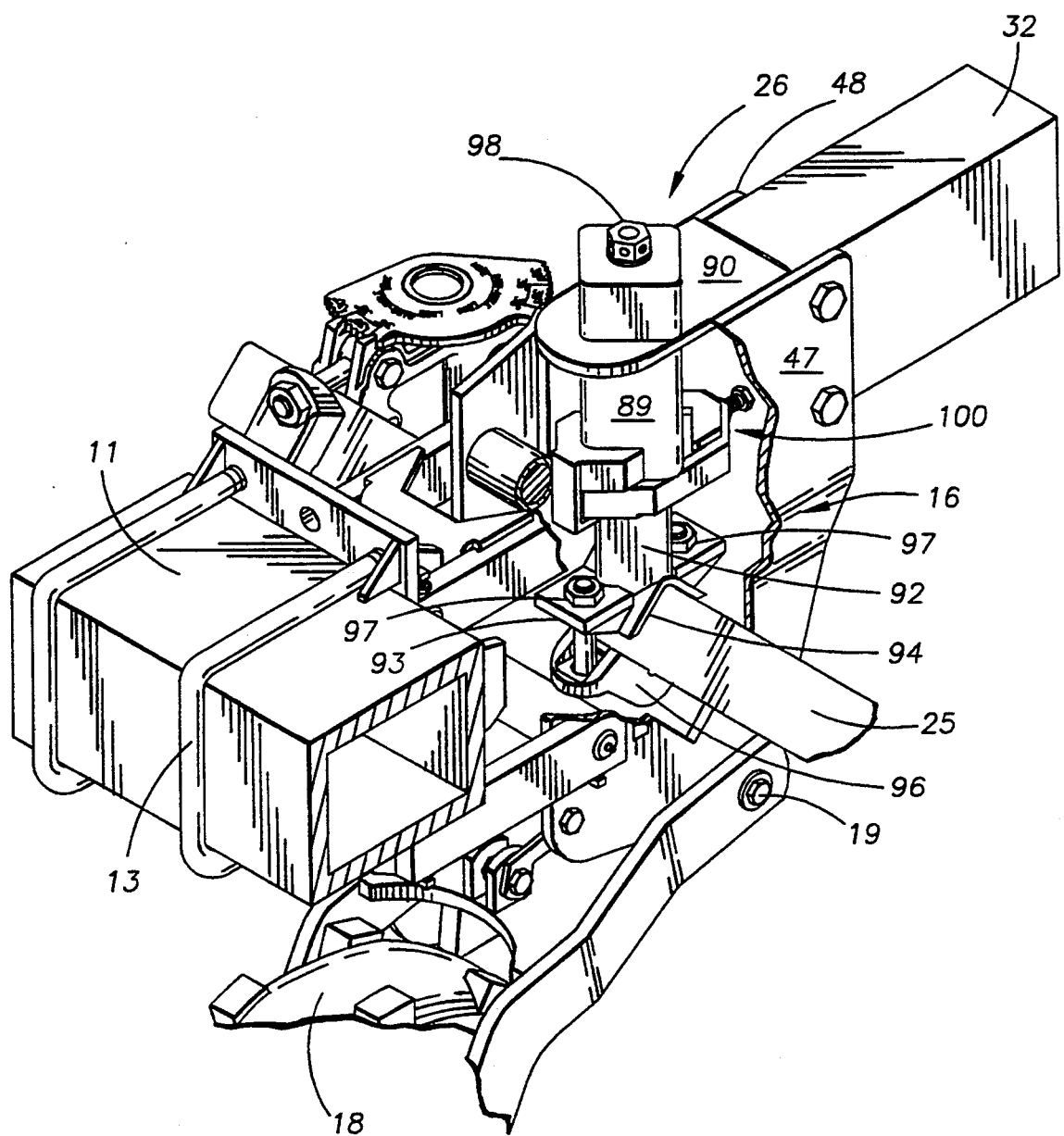
FIG. 3 is a close-up perspective view, taken from an upper, frontal left side perspective, of the cultivator unit of FIG. 2, with portions of the unit cut away to snow an adjusting screw jack mechanism for the hiller discs.
Figure 4:
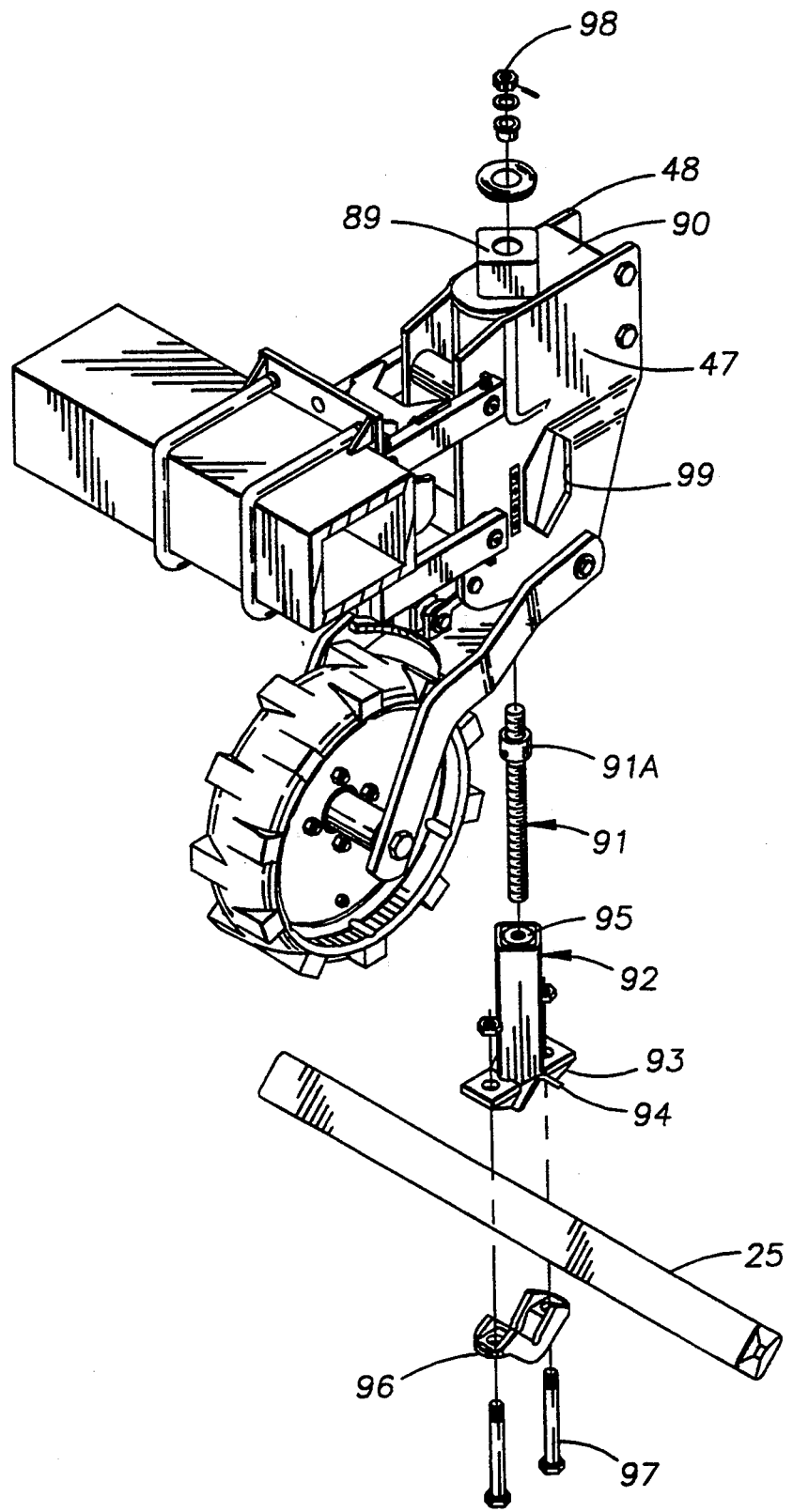
FIG. 4 is a view of the apparatus shown In FIG. 3, taken from the same perspective, but with some components of the disc hiller adjusting mechanism shown in exploded relation.

Turning now to FIGS. 3 and 4 in particular, the disc hiller height adjustment assembly 26 includes a screw jack similar to the screw jack 22 described in connection with the gauge wheel adjustment mechanism, except that the upper housing is rigidly mounted to the row unit. Thus, it includes an upper housing 89 mounted by means of a plate 90 to the side plates 47, 48 flex bracket 16 and, thus, to the main beam frame 32. The jack screw also includes a lower section 92 which is telescopically received in the upper section 89, and to the lower end of which there is mounted the upper half of a saddle clamp designated 93 and which includes an angled seat 94 for receiving and engaging the upper two surfaces of the hiller disc mounting bar 25 which has a square cross-section.

The lower portion of the saddle clamp engages the lower two surfaces of the mounting bar 25 in a similar manner; and it is designated by reference numeral 96 in FIG. 3. The upper and lower portions of the saddle clamp 93, 96 are connected together by bolts 97. The disc hiller height adjusting assembly 26 includes an internal screw jack for extending or retracting the lower housing 92 relative to the upper housing section 89 similar to that already described in connection with FIG. 5 except that the lower end of the housing 92 is rigidly mounted, by means of the saddle clamp described, to the disc hiller mounting bar 25. Thus, at the top of the upper housing 89 is a nut 98 which is mounted to an acme thread screw 91 (FIG. 4) having a fixed collar 91A. The upper end of screw 91 is inserted through the aperture of the upper housing 89, and the lower end of the screw is threaded into a threaded collar 95 mounted in the lower housing 92.

As the nut 98 is turned in one direction (e.g., clockwise) the hiller disc mounting bar 25 is raised, and as it is turned in the other direction, the hiller disc assembly is lowered relative to the cultivator unit and the main beam frame 32. Once this adjustment is made, the upper and lower sections 89, 92 of the screw jack are clamped together by means of a clamp generally designated 100 in FIG. 3 and shown in greater detail in FIGS. 6A–6C, 12 and 13, as will presently be described. However, it will first be observed that the upper and lower housing sections 89, 92 of the adjusting assembly 26 have corresponding square or rectilinear cross-sections, and that the screw jack is oriented with one diagonal extending parallel to the direction of travel—that is, in the fore-to-aft direction of the machine. This is advantageous in that it enhances the ability of the mounting structure to resist the twisting effect normally produced by the disc hillers in operation since they are mounted, like out-riggers, outboard of the main beam frame 32. Referring particularly to FIG. 1, the side plates 47, 48 of the flex mounting bracket 16 are provided with vertically elongated slots, one of which is shown in FIGS. 1 and 4 for plate 47 and 48 and designated by reference numeral 99, through which the disc hiller mounting bar 25 extends. The vertical slots in the side plates 47, 48, such as that designated 99, are located to permit vertical adjustment of the mounting bar 25, and the rear edges of those slots are located to engage the rear corner of the mounting bar 25 (which has a square cross-section) to limit its rearward movement. This arrangement permits vertical adjustment of the mounting bar 25, and further resists any torsional load on the adjusting mechanism 26 by limiting any twisting motion of the mounting bar 25.

Figure 6A:
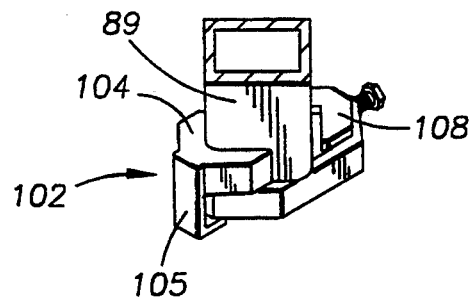
FIGS. 6A–6C are perspective views of a clamping mechanism for an adjusting screw jack of FIG. 3.
Figure 6B:
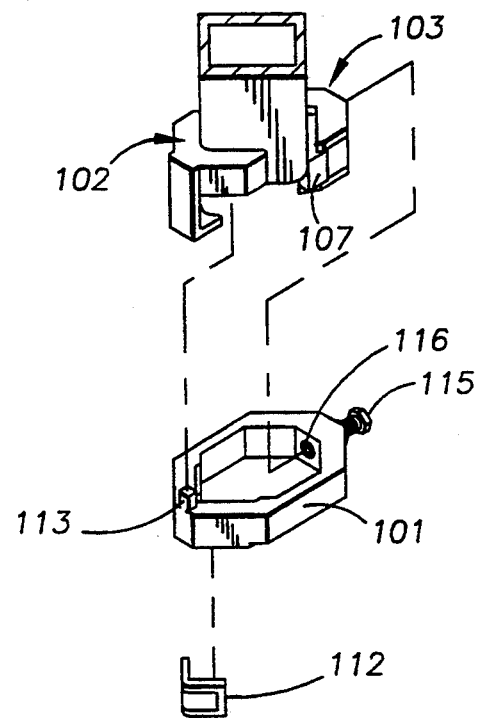
Figure 6C:
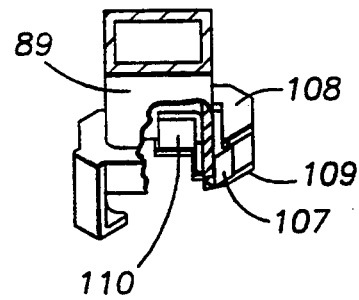
Figure 12:
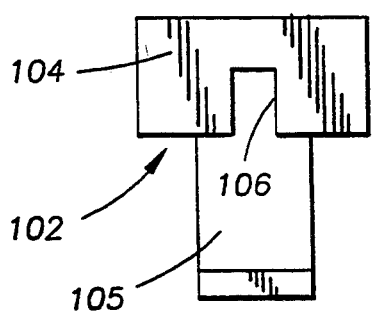
FIG. 12 is a rear view of the front weldment of the clamp of FIGS. 6A-6C.

Turning now to FIGS. 6A–6C, the clamp 100 includes a clamp ring 101, a forward or nose support weldment 102, and a rear support weldment 103. The forward support weldment 102 includes a generally V-shaped member 104 which is welded to the forward corner and adjacent sides of the upper housing (in the case of the disc hillers, upper housing 89) of the screw jack, and a depending L-shaped bracket 105, the lower horizontal portion of which is spaced beneath the V-shaped member 104 to receive the forward end of the clamp ring 101, as best seen in FIGS. 6A and 12. A slot 106 is formed in the bottom of the V-shaped member 104 which extends through the rear, center part of that member 104.

Figure 13:
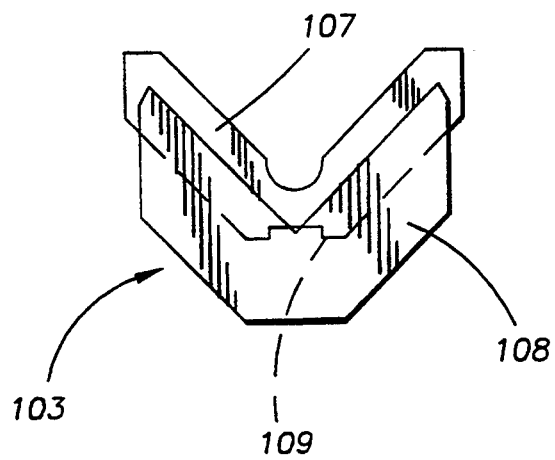
FIG. 13 is a top view of the rear weldment of the clamp of FIGS. 6A-6C.

The rear weldment 103 has a general V-shape member 107 which is welded to the rear corner and adjacent sides of the upper housing section 89 of the screw jack, but which extends below the lower edge of the upper housing 89 by a distance approximately equal to the height of the clamp ring 101. Corresponding V-shaped upper and lower plates 108, 109 are welded respectively to the top and bottom of the member 107. The plates 108, 109 are spaced apart to receive the clamp ring 101, and they extend rearwardly of the member 107 to provide a receptacle or space to support the rear section of the clamp ring when it is assembled to the forward support 102 and rear weldment 103, as best seen in FIG. 6A, the assembly step being illustrated in FIG. 6B. A vertical, central groove 109 is formed facing the rear of the member 107 (FIG. 13).

A first angle-shaped bearing pad (preferably made of a low-friction, wear-resistent material such as nylon) is designated 110 in FIG. 6, and is received between the inner rear surface of the upper housing 89 and the outer rear surface of the lower housing section 92 of the screw jack to permit the lower section to move freely within the upper section.

A corresponding angle-shaped bearing pad 112 is received in the nose portion of the clamp ring 101. A projection 113 is formed in the upper front surface of the clamp ring 101, and it is received in a corresponding slot in the lower surface of the V-shaped part 104 of the forward clamp support 102. A clamp bolt 115 is received in a threaded aperture 116 in the rear of clamp ring 101.

The clamp ring is assembled by aligning the sides of the ring 101 beneath the lower edge of the upper housing 89 and straddling the member 107. The clamp ring is then raised and slid forwardly so that the projection 113 is received in slot 106 on the lower surface of the V-shaped part 102, and the forward portion of the clamp ring is supported by the L-shaped bracket 105. The rear portion of the clamp ring 101 is simultaneously received in the space between the plates 108, 109, with the forward end of clamp bolt 115 received in slot 109 of the rear weldment 103, to assure proper alignment. The lower section of the screw jack may then be assembled to the upper housing.

When it is desired to clamp the lower section of the jack screw to the upper housing, the clamp bolt 115 is tightened, bearing against the rear surface of member 107 which is welded to the upper housing section 89, and forcing the front of the clamp ring and the bearing pad 112 to pull the front of the lower housing rearwardly so that it clamps tightly against the rear section of the upper housing.

Adjustment of Disc Hiller Working Angle

Referring to FIG. 7, a disc hiller assembly is shown mounted to the disc hiller mounting bar 25. The disc hiller of the present invention may be used interchangeably on the right or left side of the mounting bar 25. The assembly includes a main casting 112 which is formed to provide a cylindrical vertical opening to receive the upper portion of a shank 113 having a circular cross-section. The casting 112 is formed into a pair of laterally spaced extensions rearward of the shank mounting aperture, to form a clamp which is tightened by means of a bolt 114, after the shank is properly adjusted. The lower portion of the shank 113, as seen in FIG. 7, is flattened by forging; and has a spindle welded to it, to receive the hub of a bearing 115 to which a concave disc 116 is mounted. By thus forming the shank 113 into an upper, cylindrical mounting section, adjustment of the disc 116 about a vertical axis is facilitated. By forming the lower portion of the shank into a flattened section, lateral resilience is provided, permitting the disc shank to flex under use conditions should an obstruction be encountered, without breaking the shank.

The forward end of the casting 112 is formed into a lower pair of laterally spaced mounting flanges 118 to which an eye bolt 119 is pivotally mounted by bolt 120. A similar pair of flanges 121 is formed in the forward, upper section of the casting 112 for mounting a second eye bolt 122 by means of bolt 123. The flanges are formed to receive rear corner and adjacent surfaces of mounting bar 25. The mounting eye bolts 119, 122 fit respectively beneath and above the mounting bar 25 and are received in an angle clamp casting 125, and secured by nuts 126, 127 respectively for mounting the casting 112 and the disc hiller assembly to the mounting bar 25 in a manner such that the disc hiller assembly may be adjusted laterally along the mounting bar 25 as persons skilled in the art will readily appreciate.

Just above the mounting flanges 121, the casting 112 is formed into a pair of laterally spaced marker points 130. An indicator plate 131 is secured to the top of the shank 113, and it includes a first serrated section generally designated 132 and a second serrated section generally designated 133. Markings, indicia or decals are provided on the upper surface of the indicator plate 131 to properly align one of the serrate portions 132, 133 on the indicator plate with the points 130 on the casting 112 to indicate proper setting of the working angle of the disc 116. In this context, the term "working angle" refers to the horizontal angle which is formed between the plane of the peripheral cutting edge of the disc 116 and the vertical plane extending along the direction of travel of the implement. The greater the working angle, the farther laterally will be thrown the soil or residue encountered by the disc. Thus, typically, the indicia on the top of the indicator plate 131 will include grooves or serrations to accommodate a 30-inch row unit spacing and a 36–38-inch row unit spacing as well as intermediate positions. In operation, as the implement moves forward, since the hiller disc shown in FIG. 7 is a right side hiller disc, soil is moved toward the left (since the disc 116 faces toward the left)—that is, away from the row of crops.

By loosening the bolt 114, raising the shank 113 slightly to disengage the points 130 from the serrations 132, and rotating the shank 113 approximately 135° clockwise, the serrations 133 may be used to position the shank to the casting 112 by engagement with the teeth 121. In this case, the disc will face in the other lateral direction (that is, toward the right), so as to throw soil and residue to reform the crop ridge, if desired.

Height Adjusting Mechanism for Stabilizer Disc

The stabilizer disc assembly 30 is mounted to the main beam frame 32 rearward of the mounting for the disc hillers. However, the height adjusting mechanism for the stabilizer disc is similar to that for the disc hillers.

Figure 8:
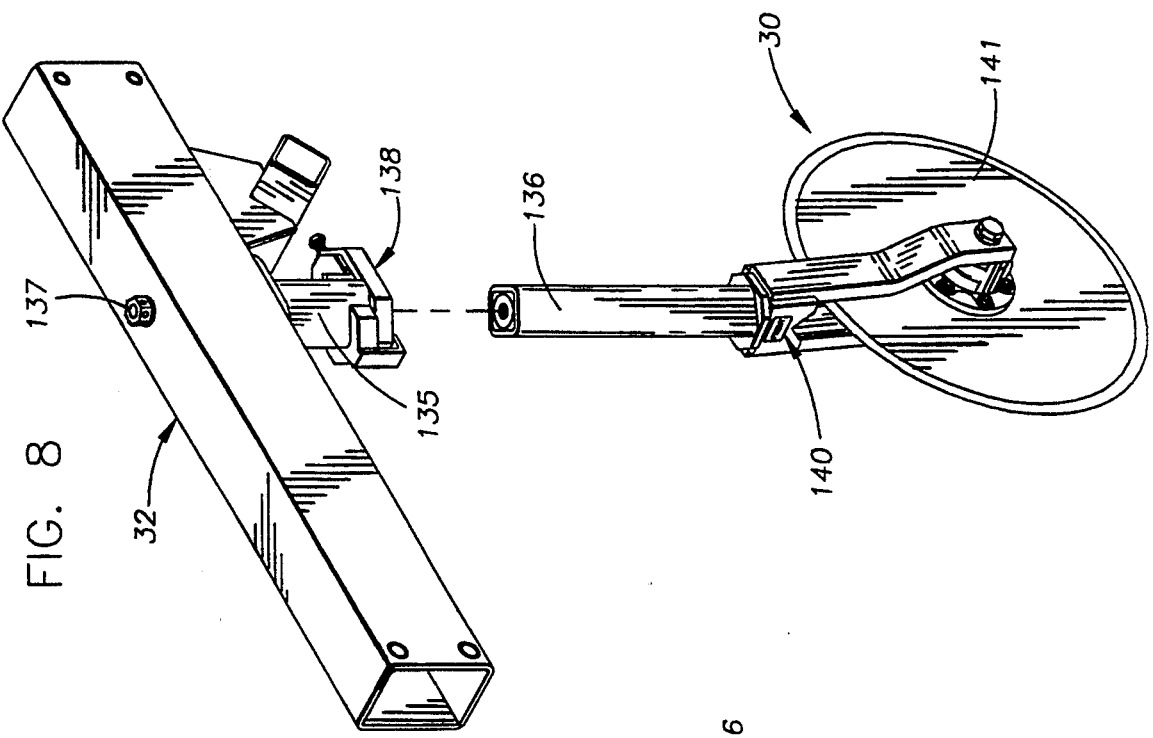
FIG. 8 is a close-up perspective view of the adjustable stabilizer disc of FIGS. 1 and 2 with the lower jack section in exploded relation relative to the upper jack section.

Turning now to FIG. 8, the stabilizer disc assembly includes a similar screw jack comprising an upper housing section 135 which is mounted to the lower surface of the main beam frame 32, and which telescopically receives a lower housing section 136. An acme-threaded screw and fixed collar (similar to screw 91 and collar 91A of FIG. 4) connect the two housing sections together in a manner already disclosed. The upper end of the screw has attached a nut 137 located above the main beam frame 32 to effect the vertical adjustment.

A clamp 138, similar to the previously described clamp shown in FIGS. 6A–6C is used to secure the upper and lower housing sections together during and after adjustment.

The bottom of the lower housing section 136 is mounted to a fork 140, which, in turn, receives the axle of a disc 141 in a conventional manner.

Adjustment of the stabilizer disc 141, and the manner in which the adjustment mechanism is secured in the adjusted position will be apparent to persons skilled in the art from the above disclosure.

Adjustable Sweep Mounting Assemblies

Figure 9A:
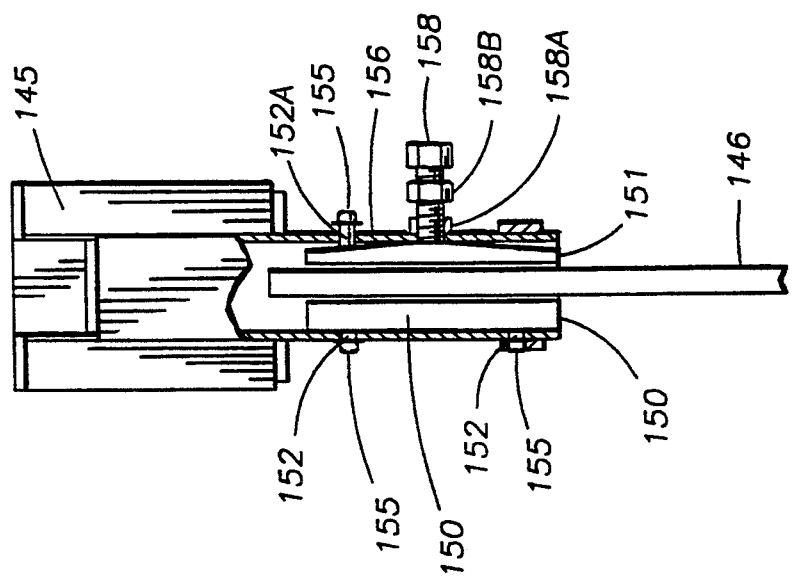
FIG. 9A is a fragmentary rear view, partly in vertical section of the sweep shank mounting clamp of FIG. 9.
Figure 9:
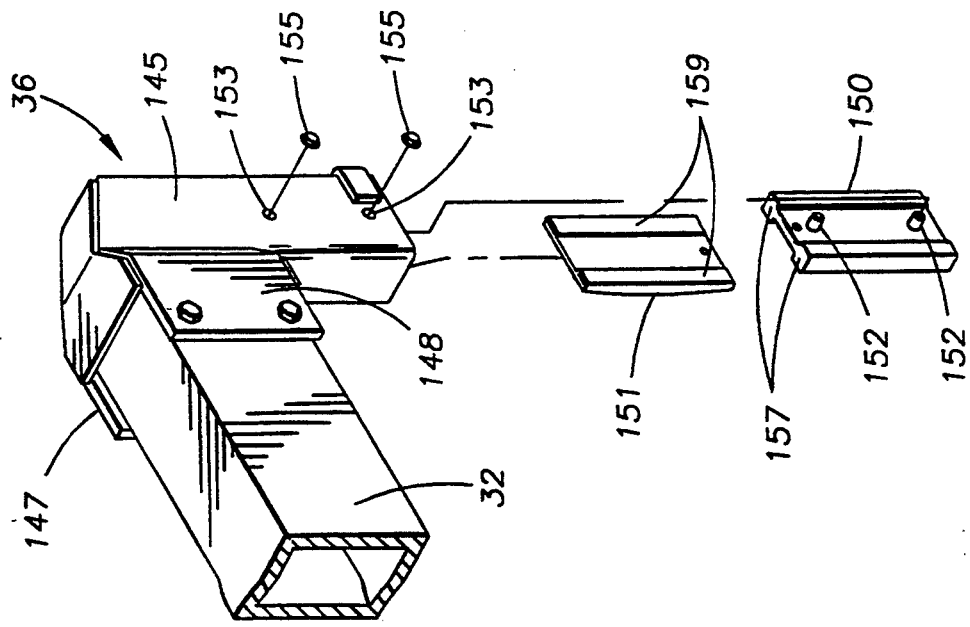
FIG. 9 is a close-up perspective detailed view of a manually adjustable mounting clamp for a cultivator sweep shank.

Referring now to FIGS. 9 and 9A, the sweep shank mount and adjustment assembly 36 is mounted to the rear end of the main beam frame 32, as seen in FIG. 1. The mount of FIG. 9 includes a weldment 145 which provides a vertically elongated receptacle for receiving a flat shank 146 (FIG. 1) which carries the sweep 35. The weldment 145 includes a pair of forwardly extending flanges 147, 148 which are bolted to the sides of the main beam frame 32. Housed within the receptacle formed by the weldment 145 are first and second clamp plates 150, 151. Clamp plate 150 is provided with a pair of outwardly extending stubs 152 which are received in aligned apertures 153 of the left side wall of the weldment 145. Retainer caps 155 are then pressed on the stubs 152 after the stubs are passed through the openings 153 for retaining the clamp plate 150 next to the inner surface of the side wall of the weldment 145, see FIG. 9A.

It will be observed that the inner, bearing surface of clamp spacer plate 150 includes a pair of spaced vertical rails 157 which provide vertical bearing surfaces for engaging and clamping the left side of the flat shank 146. The adjustable clamp plate 151 may be similarly mounted to the right side wall of the weldment 145 except that stub 152A (FIG. 9A) is longer so that the adjustable clamp plate 151 may be moved laterally to clamp the right side of the shank. The bearing wall of the adjustable clamp plate 151 also contains vertical rails 159, similar to the engaging rails 151 on the clamp spacer plate 150.

The adjustable clamp plate 151 narrows toward the top and bottom edges as seen in FIG. 9A to permit the adjustable clamp plate to adjust to the placement of the sweep shank without binding against or interfering with the right side wall 156 of the weldment 145. Clamping force is obtained by a clamp bolt 158 received in a threaded nut 158A welded to the right side wall 156 of the housing weldment 145 and is locked in place with a lock nut 158B.

The advantage of the structure of FIG. 9 is that vertical adjustment of the sweep shank is facilitated because only a single wrench is needed for adjustment and, when loosening the clamp bolt, clamping force necessary to hold the sweep assembly in place is very quickly released with a small turn of the clamp bolt. This is unlike some clamps wherein the member to be adjusted has to be pulled against a continuing friction of the clamp plates. With the clamp plates of FIG. 9, and particularly with the vertical, spaced rails 157, 159 opposing each other for clamping the opposing side walls of a flat sweep shank, once the minimum clamping force necessary to hold the shank is reached, further unloosening of the clamp bolt, will permit the shank to move freely for adjustment.

Another advantage of the arrangement of the structure of FIG. 9 in providing adjustment for the sweep is that it is economical yet reliable considering the rugged conditions of use expected of a sweep for a high residue cultivator.

Figure 10:
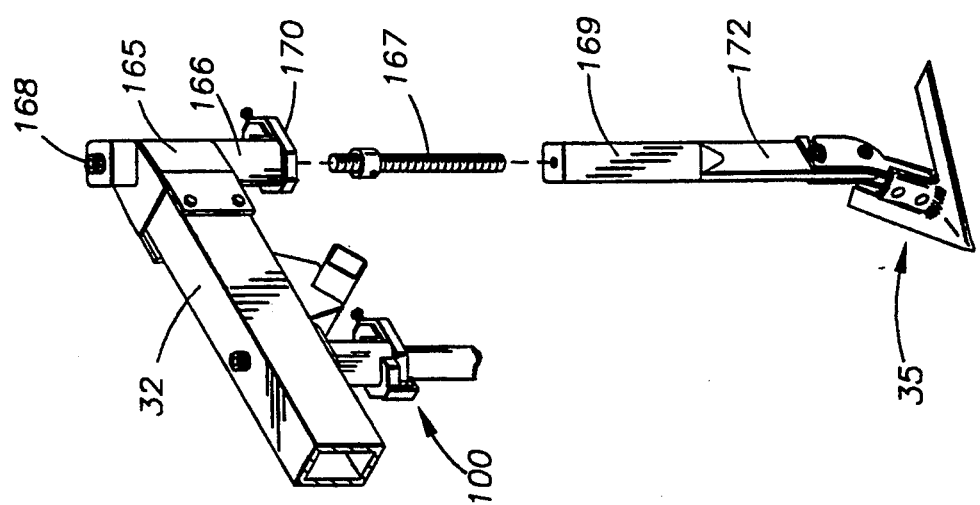
FIG. 10 is a perspective view of a continuously adjustable mounting assembly for a cultivator sweep shank employing the novel screw jack and clamp assembly of the present invention.

Turning now to FIG. 10, there is shown a second adjusting mechanism for the sweep assembly, and one which allows a more controlled vertical adjustment of the sweep, but one which is also more expensive than that shown in FIG. 9. In the embodiment of FIG. 10, a housing weldment 165 is mounted to the rear end of the main beam frame 32 in a manner similar to that described in connection with the housing 145 of FIG. 9. In the case of FIG. 10, however, the weldment 165 carries the upper housing 166 of an adjustable screw jack similar to that already described in connection with FIG. 5, including an acme thread screw 167 the upper end of which is received in and secured to a nut 168 located at the top of the upper housing 166, and the lower end of which is threaded into the top of a lower housing section 169 which is telescopically received in the upper housing section 166. A clamp 170, similar to those already described, is used to secure the two sections 166, 169 of the screw jack together during and after adjustment. A flat lower shank portion 172 is mounted to the bottom of the lower section 169 of the screw jack; and the sweep 35 is conventionally mounted to the lower shank portion 172.

Adjustment of the height of the sweep 35 relative to the main frame beam 32 is similar to the adjustments already described for the hiller disc and stabilizer, and will be understood by those skilled in the art.

Figure 11:
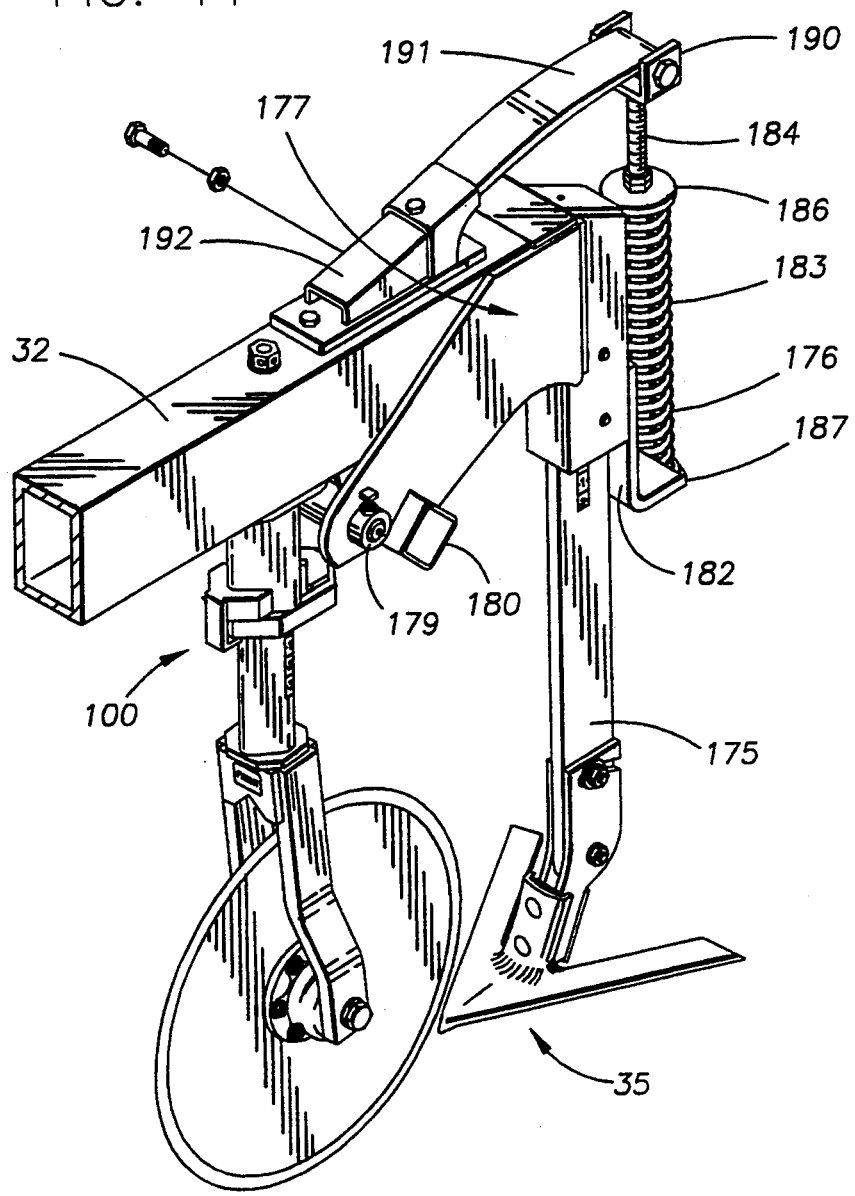
FIG. 11 is an upper, forward perspective view of a cultivator sweep assembly including a spring cushion reset mechanism.

Turning now to FIG. 11, there is shown a vertically adjustable mount for a sweep 35 having a flat shank 175 and which includes a spring cushion to permit the shank to move rearwardly and upwardly if the sweep strikes an obstruction, but to reset to the working position under the force of the spring. The upper end of the flat shank 175 is received in a housing weldment 176 which is similar to the housing weldment 145 of FIG. 9 in that it include a clamp spacer plate and an adjustable clamp plate with a clamp bolt for permitting vertical adjustment of the shank 175. However, the upper forward portions of the housing weldment 176 are provided with left and right extension plates, the left side one being shown in FIG. 11 and designated by reference numeral 177. The lower, forward portion of the extension plates are mounted to a shaft 179 which is mounted for pivotal rotation beneath the main frame beam 32, permitting the weldment housing 176 to be rotated about the axis of the shaft 179, if an obstruction is encountered by the sweep. It will be observed that the extension plate 177 is notched to fit over a square tubular mounting bar 180 on which conventional dirt shields, not shown in the drawing, may be mounted, if desired.

Mounted to the rear of the housing weldment 176 is a L-shaped bracket 182 which seats the lower end of a coil spring 183. A spring rod 184 extends through the coil spring 183 and through the bottom of the bracket 182. An upper spring retainer 186 is secured to the spring bolt 184 and receives the upper end of the coil spring 176 so that when the spring bolt 184 is moved downwardly into the spring, the retainer 186 compresses the spring 183 against a similar, conventional lower spring retainer 187 secured by the bracket 182. The upper portion of the spring bolt 184 is pivotally mounted by means of a U-shaped mounting bracket 190 to the outboard end of a leaf spring 191, the forward end of which is mounted by a spring mount 192 to the top of the main frame beam 32.

In operation, the shank 175 of the sweep may be adjusted by means of the clamp plates described in connection with FIG. 9. As the implement travels through a field, if the sweep 35 encounters an obstruction, it will be permitted to rotate rearwardly and upwardly, the extensions 177 rotating about the axis of the shaft 179, and compressing the spring 183 which provides a reset force after the obstruction is cleared. If the obstruction is so high that the sweep cannot clear it, after the spring 183 has bottomed out, the leaf spring 191 will permit further yielding without causing breakage within certain limits.

Having thus disclosed in detail preferred embodiments of the invention, together with adaptations of the inventions to different tools of a cultivator, persons skilled in the art will be able to modify certain of the structure which has been disclosed and substitute equivalent elements while continuing to practice the principle of the invention; and it is, therefore, intended that all such modifications and substitutions be covered as they are embraced within the spirit and scope of the appended claims.

We claim:

1. In an agricultural cultivator having a toolbar adapted to be pulled by a tractor, a plurality of cultivator units, a four-bar linkage for mounting each cultivator unit to said toolbar, each cultivator unit including a main frame connected to its associated four-bar linkage, a depth gauge wheel supporting said main frame for determining the operating depth of ground-engaging tools on said unit and a sweep carried by said main frame behind said gauge wheel, the improvement in said units comprising: a hiller disc assembly including a mounting bar extending laterally to both sides of said main frame; first and second discs mounted respectively to the right and left sides of said mounting bar; and adjustment means mounted to said main frame of said unit and carrying said mounting bar for adjustably setting the operating height of said discs relative to said main frame.

2. The apparatus of claim 1 further comprising a gauge wheel arm pivotally mounting said gauge wheel to said main frame to permit said gauge wheel to be raised and lowered relative to said main frame; and an adjusting assembly for said gauge wheel including a screw jack having an upper housing section pivotally connected to said main frame and a lower housing section telescopically received in said upper housing section, the bottom of said lower housing section being pivotally mounted to said gauge wheel arm.

3. The apparatus of claim 2 wherein said screw jack further comprises a threaded rod interconnecting said upper housing section and said lower housing section, and including a collar mounted to the upper portion thereof, said collar having a cylindrical outer surface defining a plurality of grooves spaced at equal increments about said cylindrical surface and extending in an axial direction; and a spring-biased detent ball mounted to ride on said cylindrical outer surface of said collar as said threaded rod is turned, said detent ball moving in and out of said grooves as said rod is turned, whereby said rod may be set at an adjusted position such that said detent ball is located in one of said grooves to resist further rotation of said rod during operation of said cultivator.

4. The apparatus of claim 1 further comprising a shank for each of said discs, each of said shanks having an upper cylindrical portion and a lower flattened portion; bearing means for rotatably mounting the associated disc to the lower, flattened portion of a shank; and clamp means for mounting the upper, cylindrical portion of said shank to the outboard end of an associated disc mounting bar.

5. The apparatus of claim 4 further comprising means defining at least one tooth adjacent the upper portion of each disc shank; and an indicator plate mounted to the upper portion of each disc shank and having a plurality of laterally spaced recesses adapted to receive said tooth to indicate the working angle of the associated disc.

6. The apparatus of claim 5 wherein said indicator plate includes a first series of adjacent recesses in one angular position of said plate indicating the setting of the associated disc when said disc faces inwardly of said main frame, said indicator plate including a second series of adjacent recesses adapted to cooperate with said tooth for positioning said disc at a predetermined working angle facing outwardly of said main frame.

7. The apparatus of claim 4 wherein said main frame comprises an elongated main frame beam having a front end and a rear end; and flex mounting plate means for connecting the front end of said main frame beam to said four-bar linkage, said flex mounting plate means further including at least one vertically elongated slot through which said disc mounting bar extends laterally, said slot cooperating with said disc mounting bar to limit the fore-and-aft motion thereof, thereby to reduce the torque transmitted from said discs to said disc hiller adjusting assembly.

8. The apparatus of claim 7 wherein said adjustment means comprises a screw jack having an upper housing mounted to said main frame of said unit, a lower housing carrying said mounting bar and in telescoping relation with said upper housing, and a screw operatively connecting said upper and lower housings such that as said screw is turned in one direction, said first and second housings extend, and when said screw is turned in a second direction, said first and second housings retract, thereby to adjust the height of said disc mounting bar relative to said main frame of said unit; and further comprising a clamp for securing the upper and lower housings of said screw jack at a desired adjusted position.

9. The apparatus of claim 8 wherein said upper and lower sections of said screw jack are housings having a generally square cross-section, said housings being mounted such that a diagonal of said cross-section extends parallel to the direction of travel of said cultivator unit, and wherein said clamp comprises a ring received around said lower section of said screw jack, a first member welded to the upper section of said screw jack and adapted to support one end of said ring in a transverse sliding motion relative to said lower section, and a second member welded adjacent the bottom of said upper housing diagonally opposite of said first member and adapted to support the other end of said ring, said ring further including a bolt adapted to engage one of said members to pull said ring transverse of the axis of said screw jack to clamp said lower section of said screw jack by reaction against said second welded member and said upper housing section.

10. The apparatus of claim 9 further comprising a first bearing pad in the form of an angle located between said ring and said lower section of said screw jack at the location of engagement during clamping; and a second bearing pad located between said upper and lower sections of said screw jack.

11. The apparatus of claim 1 further comprising a stabilizer disc; and means for adjustably mounting said stabilizer disc to said main frame including a screw jack having an upper section connected to said main frame and a lower section, in telescopic relation to said upper section and carrying said disc, and a clamp for clamping said upper section to said lower section in an adjusted position.

12. The apparatus of claim 1 wherein said sweep includes a vertical shank having a rectangular cross-section, said improvement further comprising means for mounting said sweep shank to the rear end of said main frame including a housing providing a receptacle for receiving the upper end of said shank; and first and second clamp plates located within said housing and respectively on opposing sides of said shank, each clamp plate defining at least two spaced raised rails for contacting and frictionally engaging said shank; and a clamp bolt threadedly received in said housing for releasably compressing said clamp plates against said shank to hold said shank in place.

13. The apparatus of claim 4 wherein said sweep includes a vertical shank having a rectangular cross-section, said improvement further comprising means for mounting said sweep shank to the rear end of said main frame including a housing providing a receptacle for receiving the upper end of said shank; and first and second clamp plates located within said housing and respectively on opposing sides of said shank, each clamp plate defining at least two spaced raised rails for contacting and frictionally engaging said shank; and a clamp bolt threadedly received in said housing for releasably compressing said clamp plates against said shank to hold said shank in place.

14. The apparatus of claim 11 wherein said sweep includes a vertical shank having a rectangular cross-section, said improvement further comprising means for mounting said sweep shank to the rear end of said main frame including a housing providing a receptacle for receiving the upper end of said shank; and first and second clamp plates located within said housing and respectively on opposing sides of said shank, each clamp plate defining at least two spaced raised rails for contacting and frictionally engaging said shank; and a clamp bolt threadedly received in said housing for releasably compressing said clamp plates against said shank to hold said shank in place.

15. The apparatus of claim 12 further comprising means for mounting said clamp plates within said housing while permitting one of said clamp plates to rock about a horizontal axis intermediate the top and bottom of said rockable clamp plate, said clamp bolt urging said adjustable clamp plate laterally into compression against said shank at an intermediate location thereon.

16. The apparatus of claims 1 further comprising means for adjustably mounting said sweep to the rear end of said main frame comprising: an adjustable screw jack having first and second telescoping sections, one of said sections being rigidly mounted to said main frame and the other of said sections being connected to said sweep, said jack screw including a vertical screw having an upper end provided with a nut accessible from the top of said main frame for turning said screw thereby to adjust the extension of said screw jack and the elevation of said sweep; and a clamp for securing said first and second housing sections rigidly together after an operating adjustment is made.

17. The apparatus of claim 11 further comprising means for adjustably mounting said sweep to the rear end of said main frame comprising: an adjustable screw jack having first and second telescoping sections, one of said sections being rigidly mounted to said main frame and the other of said sections being connected to said sweep, said jack screw including a vertical screw having an upper end provided with a nut accessible from the top of said main frame for turning said screw thereby to adjust the extension of said screw jack and the elevation of said sweep; and a clamp for securing said first and second housing sections rigidly together after an operating adjustment is made.

18. The apparatus of claim 1 wherein said sweep includes a vertical, flat shank, said apparatus further comprising a housing defining a receptacle for receiving the upper end of said sweep shank; means for releasably clamping the upper end of said sweep shank in said housing; first and second side extensions connected to said housing and extending forwardly thereof; means for pivotally mounting said extensions for rotation about a horizontal axis whereby when said sweep engages an obstruction, permitting said sweep to move rearwardly and upwardly upon engagement of said obstruction; and cushion-spring means connected between said main frame and said housing for yieldably urging said housing and said sweep into the operating position.

19. The apparatus of claim 18 wherein said cushion spring means includes an upwardly extending spring bolt, said apparatus further comprising a leaf spring having one end connected to said main frame and the other end pivotally connected to said spring bolt, whereby further yielding is permitted after said coil spring bottoms out to avoid breakage of said sweep.

20. In an agricultural cultivator having a toolbar adapted to be pulled by a tractor, a plurality of cultivator units, a four-bar linkage for mounting each cultivator unit to said toolbar, each cultivator unit including a main frame connected to its associated four-bar linkage, a depth gauge wheel supporting said main frame for determining the operating depth of ground-engaging tools on said unit and a sweep carried by said main frame behind said gauge wheel, the improvement in said units comprising: a gauge wheel arm mounting said gauge wheel to said main frame of said unit; an adjustable screw jack having first and second telescoping housing sections and an adjusting member extending through said first housing section for external access; means for pivotally mounting said upper housing section to said main frame of said unit in a generally vertical orientation with said adjusting member accessible from the top of said unit; and means for pivotally mounting said second housing section of said screw jack to said gauge wheel arm at a location displaced from said pivotal mounting of said gauge wheel arm to said main frame, whereby turning said adjusting member of said screw jack will adjust the length of said screw jack and thereby adjust the height of said main frame of said unit relative to the ground.

21. In an agricultural cultivator having a toolbar adapted to be pulled by a tractor, a plurality of cultivator units, a four-bar linkage for mounting each cultivator unit to said toolbar, each cultivator unit including a main frame connected to its associated four-bar linkage, a depth gauge wheel supporting said main frame for determining the operating depth of ground-engaging tools on said unit and a sweep carried by said main frame behind said gauge wheel, the improvement in said units comprising: a disc hiller assembly including a mounting bar extending to both sides of said main frame; first and second disc hillers mounted respectively to said mounting bar; an adjustable screw jack having first and second telescoping housing sections, one of said housing sections being mounted to said main frame and the other of said housing sections being mounted to said discs mounting bar, whereby adjustment of said screw jack adjusts the height of said disc hiller assembly relative to said main frame; and means for reducing torsional forces on said adjustable screw jack as said discs engage soil in use.

22. In an agricultural cultivator having a toolbar adapted to be pulled by a tractor, a plurality of cultivator units, a four-bar linkage for mounting each cultivator unit to said toolbar, each cultivator unit including a main frame connected to its associated four-bar linkage, a depth gauge wheel supporting said main frame for determining the operating depth of ground-engaging tools on said unit and a sweep carried by said main frame behind said gauge wheel, the improvement in said units comprising: said main frame including a main tubular beam extending in the direction of travel; a stabilizer disc mounted to said beam behind said gauge wheel; and an adjustable screw jack for adjusting the height of said stabilizer disc relative to said main frame including first and second telescoping housing sections and an adjusting member extending through said beam and located above said beam, said adjusting member interconnecting said first and second housing sections, one of said housing sections being mounted to said beam and the other of said housing sections being mounted to said stabilizer disc, whereby turning of said adjusting member adjusts the height of said stabilizer disc relative to said beam; and a clamp carried by one of said housing sections of said screw jack for clamping said first and second housing sections rigidly together when a desired adjustment is made.

23. In an agricultural cultivator having a toolbar adapted to be pulled by a tractor, a plurality of cultivator units, a four-bar linkage for mounting each cultivator unit to said toolbar, each cultivator unit including a main frame connected to its associated four-bar linkage, a depth gauge wheel supporting said main frame for determining the operating depth of ground-engaging tools on said unit and a sweep carried by said main frame behind said gauge wheel, the improvement in said units comprising: said sweep having a flat bar shank, said apparatus further comprising means for adjustably mounting said sweep shank to said main frame of said unit including housing means mounted to said main frame and defining a vertically extending receptacle for receiving said shank, a first clamp plate mounted to one side of said housing for engaging one side of said shank, a second clamp plate mounted to an opposing side of said housing and adapted to engage the opposing side of said shank, said second clamp plate characterized in having a center portion of increased thickness and top and bottom portions of reduced thicknesses, thereby permitting said second clamp plate to adjust about its mid section; and clamping means for urging said second clamp plate at its mid section into engagement with said shank, thereby compressing said shank against said clamp plates, said clamp plates further characterized in that each clamp plate defines first and second laterally spaced vertical flat rail sections located in opposing relation to the corresponding rails on the opposing clamp plate for engaging opposing sides of said shank.

24. In an agricultural cultivator having a toolbar adapted to be pulled by a tractor, a plurality of cultivator units, a four-bar linkage for mounting each cultivator unit to said toolbar, each cultivator unit including a main frame connected to its associated four-bar linkage, a depth gauge wheel supporting said main frame for determining the operating depth of ground-engaging tools on said unit and a sweep carried by said main frame behind said gauge wheel, the improvement in said units comprising: said main frame including a tubular beam extending in the direction of travel, said sweep including a shank, said apparatus further comprising housing means for receiving and mounting said sweep shank, said housing means being mounted to said main beam for pivotal motion about a transverse axis forward of said shank whereby said shank and sweep may be moved rearward and upward relative to said main frame, a coil spring having a first end mounted to said housing for resiliently urging said sweep into the ground-engaging use position; and a leaf spring having a first end connected to said beam and second end connected to said coil spring means, whereby the initial displacing motion of said sweep will compress its coil spring and further displacing motion of said sweep after said coil spring is fully compressed will cause said leaf spring to continue to flex, thereby to avoid breakage of said sweep or sweep shank.

* * * * *